United States Patent [19]

Kobayashi et al.

[11] Patent Number: 5,754,376
[45] Date of Patent: May 19, 1998

[54] MAGNETORESISTIVE HEAD WITH HARD MAGNETIC BIAS

[75] Inventors: Toshio Kobayashi; Chiharu Mitsumata, both of Gumma, Japan

[73] Assignee: Hitachi Metals, Ltd., Tokyo, Japan

[21] Appl. No.: 715,383

[22] Filed: Sep. 12, 1996

[30] Foreign Application Priority Data

Sep. 12, 1995 [JP] Japan ................... 7-234148

[51] Int. Cl.$^6$ .................................................... G11B 5/39
[52] U.S. Cl. .................................................... 360/113
[58] Field of Search ................................. 360/113, 125, 360/126; 338/32 R; 324/252

[56] References Cited

U.S. PATENT DOCUMENTS

| | | | |
|---|---|---|---|
| 5,018,037 | 5/1991 | Krounbi et al. | 360/113 |
| 5,436,777 | 7/1995 | Soeya et al. | 360/113 |
| 5,438,470 | 8/1995 | Ravipati et al. | 360/113 |
| 5,442,507 | 8/1995 | Koga et al. | 360/113 |
| 5,461,526 | 10/1995 | Hamakawa et al. | 360/113 |
| 5,461,527 | 10/1995 | Akiyama et al. | 360/113 |
| 5,471,358 | 11/1995 | Tadokoro et al. | 360/113 |
| 5,483,402 | 1/1996 | Batra | 360/113 |
| 5,485,334 | 1/1996 | Nix et al. | 360/113 |

*Primary Examiner*—Jefferson Evans

[57] ABSTRACT

A magnetoresistive (MR) head for sensing magnetic data recorded on a magnetic recording medium with high track density and high linear density includes a magnetoresistive conductive layer (MR layer), a soft magnetic layer (SAL) for transversely biasing the MR layer and hard magnet layers for longitudinally biasing and controlling magnetization in the central sensing regions of the MR layer and the SAL. The longitudinal bias applied to the SAL is less than that to the MR layer so that a sensing current produces an effective magnetic field to saturate the SAL transversely. So, magnetization in the MR layer is kept at an angle of 40 to 45 degrees to easy magnetization direction of the MR layer and the improved reproducing output is obtained.

18 Claims, 4 Drawing Sheets

5,754,376

MAGNETORESISTIVE HEAD WITH HARD MAGNETIC BIAS

DETAILED DESCRIPTION OF THE INVENTION

BACKGROUND OF THE INVENTION

This invention relates to a magnetic head for reproducing recorded data from a magnetic recording medium, particularly to the structure of a magnetoresistive head with a hard magnetic bias.

A magnetoresistive (MR) head has been known for many years as a magnetic head which can read data recorded on a magnetic recording medium at high recording density. The head has a sensor formed of a magnetoresistive material with an electric resistance which varies as a function of applied magnetic field. The varying resistance characteristic is used to detect recorded data from a magnetic recording medium. A variety of MR heads have been developed to satisfy traditional demands. But, to accomplish ever increasing recording density, track widths have been ever decreased and linear density perpendicular to track width has been increased. It has been difficult to produce an MR head to meet a narrower track width and a higher linear density, using conventional technology.

To operate an MR element properly, the MR element is biased to respond linearly to the recorded magnetic field. Two magnetic biases with different directions should be applied. At first, a transverse magnetic bias is applied. This bias field is perpendicular to a magnetic recording medium plane and parallel to the MR element plane. The second bias is a longitudinal magnetic field running parallel to the magnetic recording medium plane. The longitudinal bias suppresses Barkhausen noise which is caused due to multi-magnetic domain structure in the MR element. FIG. 7 shows a magnetic head structure having a MR transducer shown in JPA 3-125311(corresponding to U.S. Pat. No. 5,018,037), for example.

As shown in FIG. 7(a), the MR head comprises a recording portion separated from a reproducing portion formed on a substrate 20. The recording portion writes information signal on a magnetic recording medium by flowing recording current signal through a coil 22. FIG. 7(b) shows an enlarged sensing part of the reproducing portion. On an under-shield layer 6, a magnetoresistive element (MR element) is formed which comprises a multilayer of structure having a soft adjacent layer (SAL) 4, a non-magnetic spacer layer 3 and an MR layer 1, separated from the under-shield layer by an under-reproducing gap layer. On the both ends of the MR element, hard magnet layers 2 and conductor leads 5 are formed, and an upper-reproducing gap layer and an upper-shield layer 11 are positioned to cover the MR element. In the drawing, the SAL 4 causes a transverse bias and the hard magnet layers 2 cause a longitudinal bias.

In an abutting junction type of MR head, since the MR layer as well as the SAL form an abutting junction with the hard magnet layers at the ends of the magnetic sensing region, the longitudinal bias caused from the hard magnet layers is applied to not only the MR layer but the SAL at the same time. The term "abutting junction" or "contiguous junction" used in this specification means that the hard magnet layer electrically and magnetically continuously adjoins the MR layer or the SAL. As a result of this, more longitudinal bias than necessary is applied to the SAL so that the magnetization of the SAL in the transverse direction cannot be saturated. Accordingly, transverse bias that the SAL provides to the MR layer is reduced to under-bias state and the reproduced signal output is reduced. If the thickness of the SAL is increased to properly bias, the sense current for detecting signal will separately flow through the SAL eventually to reduce the reproducing output. Also, due to the strong longitudinal bias, the transverse bias is relatively weakened in the regions of the MR layer and the SAL adjacent the boundary with the hard magnet layer. Therefore, magnetization rotation in the adjacent regions is restricted to reduce the effective track width and it is difficult to control the track width.

Accordingly, the MR element with a narrower track width decreases reproducing output and it tends to be difficult to sense a signal.

SUMMARY OF THE INVENTION

On the MR element with a narrow track width to which longitudinal and transverse biases are applied, it is an object of the invention to provide an MR head for effectively detecting magnetic field signals from a magnetic recording medium. Particularly, the inventional structure eliminates any decrease in reproducing output which is caused when a longitudinal bias is applied by hard magnet layers. Further, this invention improves precise control of effective track width which is difficult to control with a conventional MR head having hard magnet layers.

According to the invention, the longitudinal bias from hard magnet layers has less influence on the track region of the SAL than that of the MR layer to obtain more effective sensing ability of reproducing output from a magnetic recording medium. That is, the hard magnet layers bias a transverse bias layer (SAL) of soft magnetic material magnetically less than the track region of the magnetoresistive conductive layer (MR layer) to improve SAL biasing effect for transversely biasing the MR layer. So, highly sensitive MR head even with a narrow track width can be obtained.

DESCRIPTION OF THE PREFERRED EMBODIMENT

Figure 6:
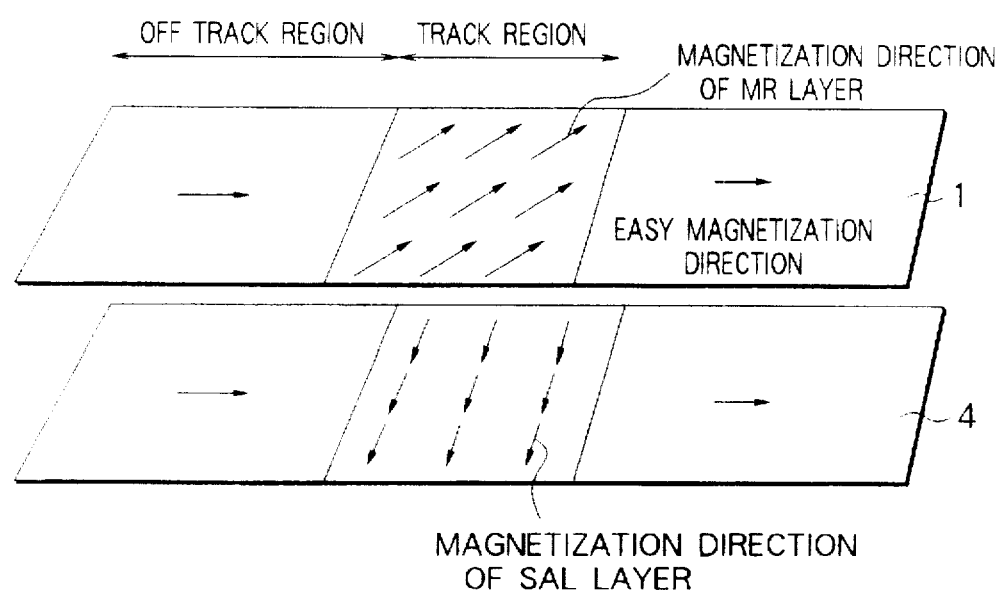
FIG. 6 is an explanatory diagram showing magnetization directions of an MR layer and an SAL.
Figures 7A, 7B:
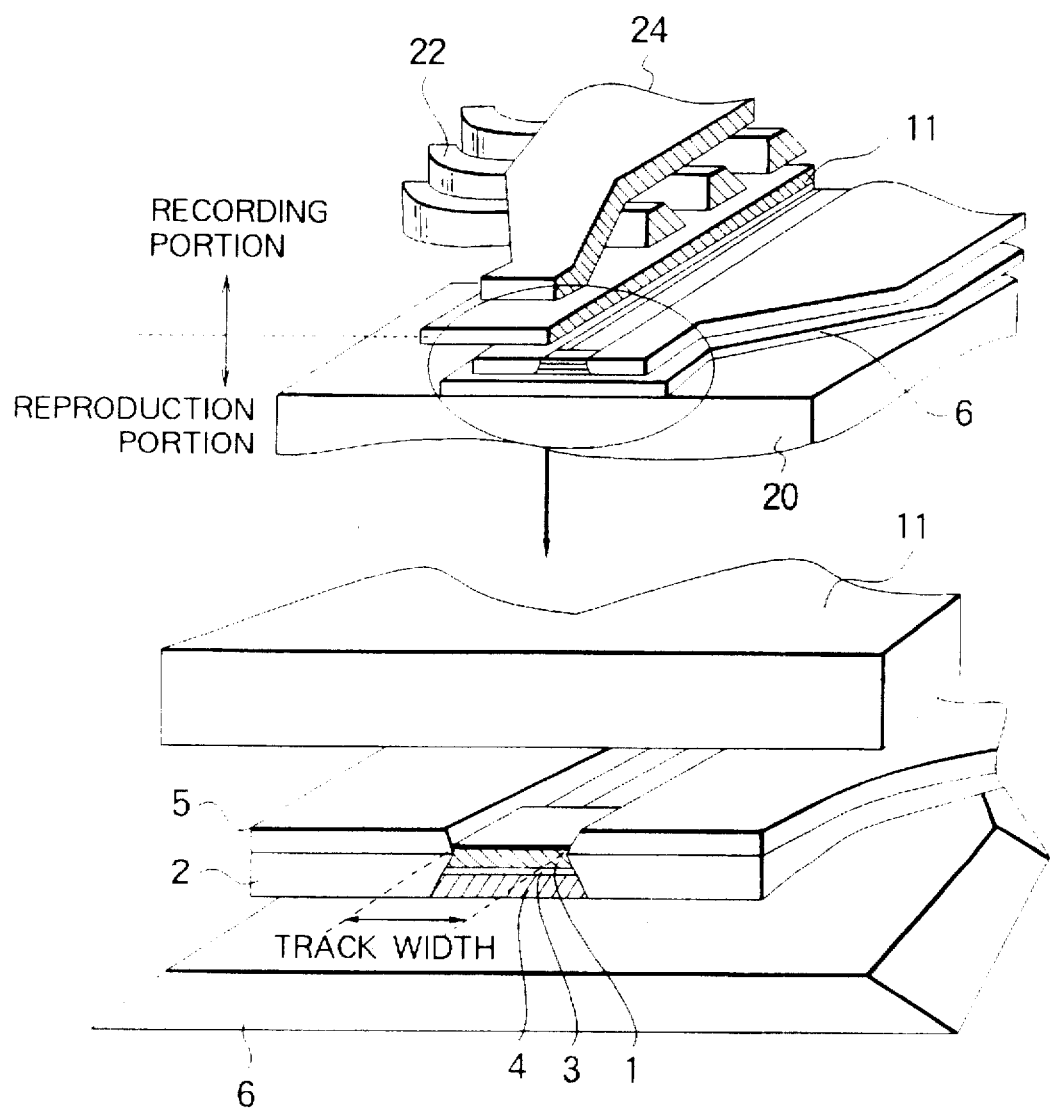
FIG. 7 is a partially sectional perspective view of a conventional MR head.

Referring to FIG. 6, in an SAL biased MR head, the magnetization of MR layer 1 is biased to direct its magnetic direction at an angle of about 40 degrees to about 45 degrees to the magnetically easy direction (i.e., longitudinal direction) so that the reproducing output can be linear. To carry out this, the magnetization of the SAL 4 should be directed about 90 degrees (transverse direction) from the magnetically easy direction (longitudinal direction). Since both the magnetic layers (MR layer and SAL) magnetostatically couple with each other, the magnetization of each layer tends to oppose the other. The rotation angle of the magnetization is defined as a vector sum of magnetizations in each of the layers. Accordingly, if longitudinal bias applied to the SAL 4 is too large, the magnetization of the SAL 4 tilts to the longitudinal direction and the rotation angle reduces from ideal 90 degrees to a smaller angle. As a result, the magnetization of the MR layer 1 tilts to the longitudinal direction so that the linearity is lost and reproduction output is decreased.

According to the invention, the longitudinal bias applied to the SAL is weak enough that sensing current flowing through the MR layer sufficiently magnetizes the SAL transversely. Since the transverse magnetic field in the SAL caused by the sensing current in the MR layer is normally about 10 to 20 Oersteds, the longitudinal bias to the SAL is preferably less than 70% of that.

On the other hand, a longitudinal bias applied to the MR layer 1 is critical to suppress Barkhausen noise. Accordingly, it is necessary to apply a longitudinal bias to the MR layer 1 while a weak longitudinal bias is applied to the SAL 4. It is effective to limit the SAL 4 only to the track region, since Barkhausen noise in the SAL occurs mainly at the off-track portion, that is, outside the track region According to the invention, to obviate difficulties in prior art MR head, the longitudinal bias is properly applied to the MR layer and the SAL by removing the off-track region of the soft magnetic layer (SAL) which is a Barkhausen noise source, by more weakly biasing the off-track region of the soft magnetic layer (SAL) by hard magnet layers comparatively to the MR layer, or by differing the longitudinal length of the SAL layer from that of the MR layer.

Since the longitudinal bias applied to the track region of the SAL is smaller than that to the magnetic sensing region of the MR layer, the soft magnetic layer (SAL) can be sufficiently saturated transversely to improve SAL biasing effect for transverse biasing of the MR layer. So, the linearity of output is more improved even for narrower track and high linear density. Further, since the MR layer is properly biased by the above reason, transverse bias can be applied even to the end portion of physical track of the MR layer to eliminate such causes as narrowing an effective track width which have been observed, and the difference between the physical track width defined on the basis of the produced form and the effective track width which is observed by a write/read test can be reduced, so that the MR head of the invention can be applied to narrower track.

The invention will be explained in detail by the following examples.

(EXAMPLE 1)

Figure 1:
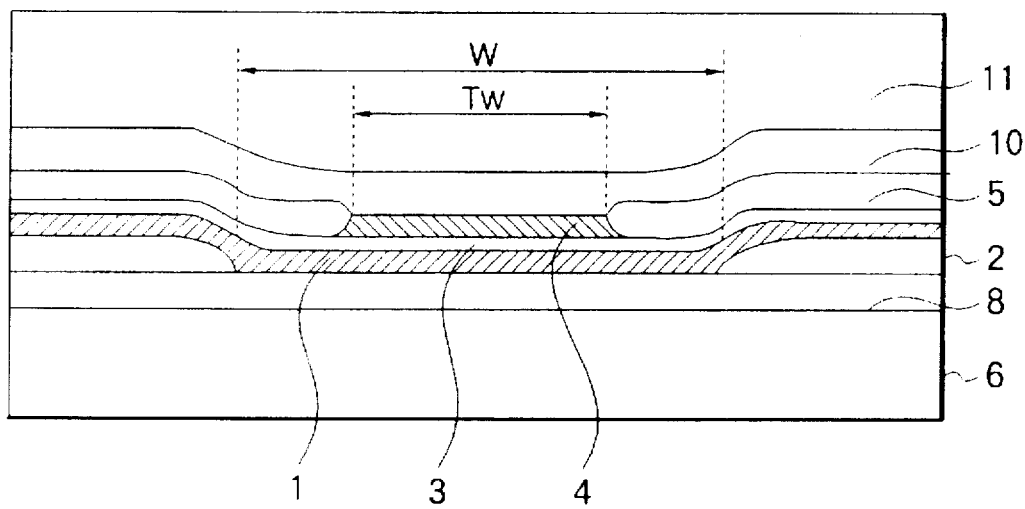
FIG. 1 is an end view of an MR head of an example of the invention.

FIG. 1 shows an enlarged structure of an MR element portion observed from an air bearing surface of MR slider, in which hard magnet layers 2 for longitudinally biasing are positioned under the end portions of an MR layer 1, and an SAL 4 and conductor leads 5 are placed on a non-magnetic spacer layer 3 extending over the MR layer 1. The hard magnet layer 2 of CoPt was produced by a lift-off process on an under-reproducing gap layer 8 extending over an undershield layer 6 of CoTaZr. The inside distance W between the hard magnet layers was formed to be 3 um. For the MR layer 1 of NiFe to directly contact the hard magnetic layers 2 of CoPt, the surfaces of the CoPt layers were lightly milled just before forming the NiFe layer. On the MR layer 1, the non-magnetic spacer layer 3 of Ta of 10 nm thick and the SAL 4 of NiFeCr were formed in piles and the SAL was milled to leave the track region Tw. After then, Mo conductor leads 5 were formed. The reproduction track Tw in this example was 2 um wide. A self-alignment process that uses a single mask was applied to a series of steps of patterning of the SAL through forming the leads. Further, an upper reproducing gap layer 10 and an upper shield layer 11 were formed over the MR element. The MR layer 1 and the SAL 4 were 20 nm thick and 15 nm thick, respectively. A detailed explanation is omitted here, but the head had a composite magnetic head structure in which an inductive head for recording was formed over the MR element.

After data were recorded on a medium by the inductive head formed over the MR element, reproducing outputs of the data were measured by the MR head. The track width of the recording head was 2.7 um that was about 1.3 times that of the reproduction head. The MR head was designed so that the sensing current density in the MR element was $2.5 \times 10^7$ A/cm$^2$ and the reproducing output was evaluated with sensing current which wave asymmetry was less than 5%. As a result of the measurement, the normalized reproducing outputs (converted value per track width) showed 205 to 240 mV/um. A conventional MR head which was longitudinally biased by hard magnet layers with an abutting junction as shown in U.S. Pat. No. 5,018,037 did not provide sufficient reproducing outputs when it had a narrow track width of about 2 um and its normalized reproducing outputs were 160 to 200 mV/um at most. The MR head of the invention provided output by 20 to 30% higher than that of the conventional head.

Although the conventional MR head of abutting junction type showed effective track width by about 1.5 um narrower than physical track width (optical track width), the reduction of the effective track width in the MR head of this example was observed to be less than 0.5 um. Accordingly, the invention has improved precise control in track width. Further, while a small current of about $1 \times 10^7$ A/cm$^2$ was supplied to the MR head of this example and a longitudinal field was applied by the hard magnet layers, magnetization of the MR layer and the SAL was observed from the plane opposite to the medium by an MFM (magnetic force microscope) apparatus. The longitudinal bias in each track region of the MR layer and the SAL was 14 Oersteds and 9 Oersteds, respectively.

In this example, since the MR layer directly contacted the hard magnet layers, the longitudinal bias of 14 Oersteds was applied to the MR layer due to the ferromagnetic exchange between the MR layer and the hard magnet layers and due to the magnetic field exerted from the hard magnet layers. By contrast, it is supposed that only a leakage magnetic field from the hard magnet layers reached the SAL to apply the weak longitudinal bias of 9 Oersteds to it. The longitudinal bias of 14 Oersteds applied to the MR layer suppressed Barkhausen noise, while the longitudinal bias of 9 Oersteds applied to the SAL suppressed Barkhausen noise which would be caused by discontinuous magnetization attitude in the SAL. But, since the longitudinal bias to the SAL was weaker than that to the MR layer, the magnetization in the SAL, which should be transverse, remained to be in a transverse direction and the phenomenon that the magnetization tended to return to longitudinal in a conventional MR head was not remarkably observed. As a result, an expected SAL biasing effect was obtained in the MR head structure of this invention and a normalized reproduction output was obtained. While the magnetization in the track end portions of an SAL of a conventional MR head tended to return to the longitudinal direction because a longitudinal bias was strongly applied to the track end portions and the SAL biasing effect was reduced to decrease the effective track width, in the present invention the longitudinal bias applied to the SAL was reduced to maintain SAL biasing effect even at the track end portions and to decrease the reduction of the effective track width.

(EXAMPLE 2)

Figure 2:
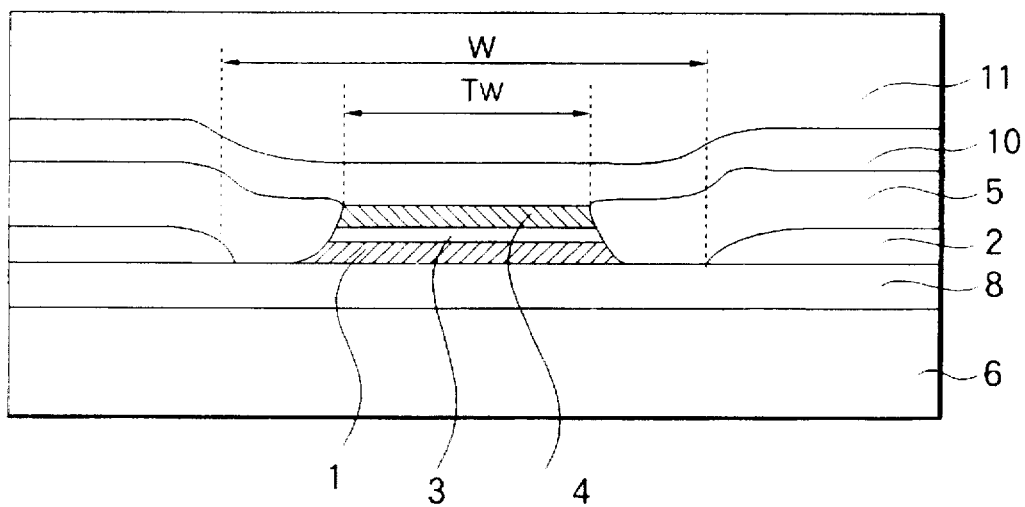
FIG. 2 is an end view of an MR head of another example of the invention.

FIG. 2 shows an enlarged view of an MR element portion of an MR head observed from an air bearing surface, in which hard magnet layers 2, as longitudinal bias layers, are positioned outside of the track region of an MR layer 1 and an SAL 4 is placed over a non-magnetic layer 3 extending over the MR layer. As shown in FIG. 2, Ta layer 3 and the MR layer were treated together with the SAL by a milling process and the multilayer of SAL/Ta/MR exists only over the track width Tw. The MR layer 1 is on a level with the hard magnet layers 2 and the SAL 4 separated from the MR layer by the non-magnetic spacer layer 3 is not on a level with the hard magnet layers 2. The MR head of this example was prepared by a similar process described in EXAMPLE 1. The recording track width was 2.7 um and about 1.3 times the reproduction track width. And the inside distance W between the hard magnet layers 2 was 3 um and the track width Tw of the MR was 2 um.

As in EXAMPLE 1, data were recorded on a medium by the inductive head formed over the MR head and reproducing outputs of the data were measured by the MR head. The MR head was designed so that the sensing current density in the MR layer 1 was $2.5 \times 10^7$ A/cm$^2$ and the reproducing output was evaluated with sensing current which wave asymmetry was less than 5%. As a result of the measurement, the normalized reproducing outputs (converted value per track width) were 210 to 250 mV/um which were the same level as EXAMPLE 1. The reduction of the effective track width in the MR head was observed less than 0.5 um. And, the longitudinal bias, measured by an MFM apparatus, in each track region of the MR layer 1 and the SAL 4 was 12 Oersteds and 7 Oersteds, respectively. Accordingly, the MR head of the present invention was excellent in reproducing output and in track width control, as compared with the conventional one.

(EXAMPLE 3)

Figure 3:
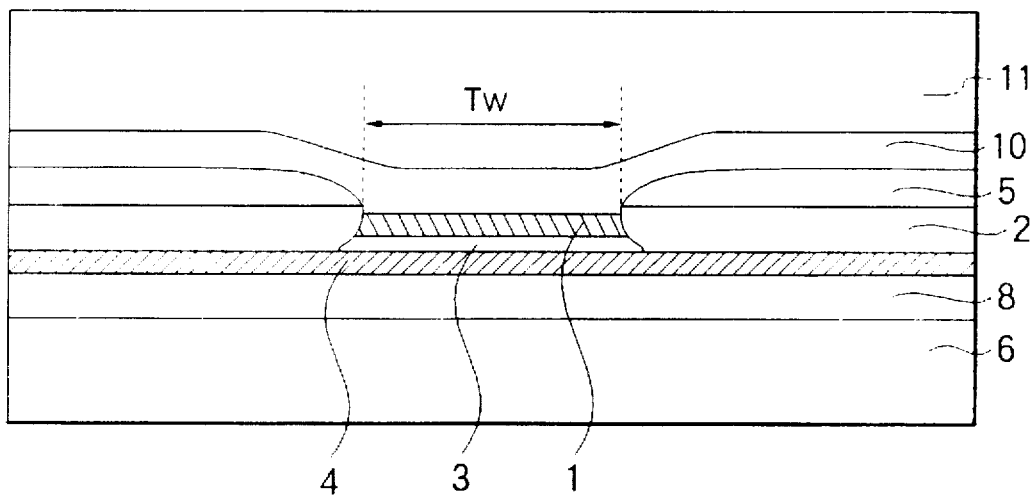
FIG. 3 is an end view of an MR head of the third example of the invention.

FIG. 3 shows an enlarged structure of an MR element portion of an MR head observed from an air bearing surface, in which an MR layer 1 is positioned on a non-magnetic spacer layer 3 and forms an abutting junction with hard magnet layers 2. In this example, the soft magnetic layer (SAL) 4 of NiFeCr was formed on an under-reproducing gap layer 8 extending over an under-shield layer 6 of CoTaZr and then the non-magnetic spacer layer 3 of Ta and the MR layer 1 were formed in piles on the SAL 4. The multilayer of SAL/Ta/MR was treated by a milling process to form a stripe. After treating the MR layer and the Ta layer to leave their track region, the hard magnet layers and the Mo conductor leads 5 were formed on the off-track regions of the SAL. The MR layer 1 had reproducing track width Tw of 2 um. The hard magnet layers were formed after lightly milling the SAL surface. A self-alignment process was applied to a series of steps of patterning of the MR layer and the Ta layer through forming the hard magnet layers and the conductor leads. Further, an upper-reproducing gap layer 10 and an upper-shield layer 11 were formed over the MR element. The MR layer 1 and the SAL 4 were 20 nm thick and 15 nm thick, respectively. A detailed description is omitted here, but the head had an inductive head for recording formed over the MR element.

As a result of recording/reproducing evaluation of the prepared MR head, the normalized reproducing outputs (converted value per track width) were 190 to 230 mV/um. In the evaluation, the recording track width was 2.7 um. The MR head was designed so that the sensing current density in the MR element was $2.5 \times 10^7$ A/cm$^2$ and the reproducing output was evaluated with sensing current which wave asymmetry was less than 5%. As in EXAMPLE 1, the MR head of this example provided higher output than the conventional head. The reduction of the effective track width in the MR head of this example was observed to be 0.3 to 0.7 um. Accordingly, the MR head of the present invention was excellent in track width control as compared with the conventional one. And, the longitudinal bias, measured by an MFM apparatus, in each track region of the MR layer and the SAL was 24 Oersteds and 15 Oersteds, respectively.

Since the MR layer 1 formed an abutting junction with the hard magnet layers 2, a longitudinal magnetic field was applied to the MR layer 1 mainly due to the magnetic field exerting from the hard magnet layers 2. And, it is supposed that a weak longitudinal bias was applied to the SAL 4 due to ferromagnetic exchange between the off-track region (out of the track area) of the SAL 4 and the hard magnet layers 2.

(EXAMPLE 4)

Figure 4:
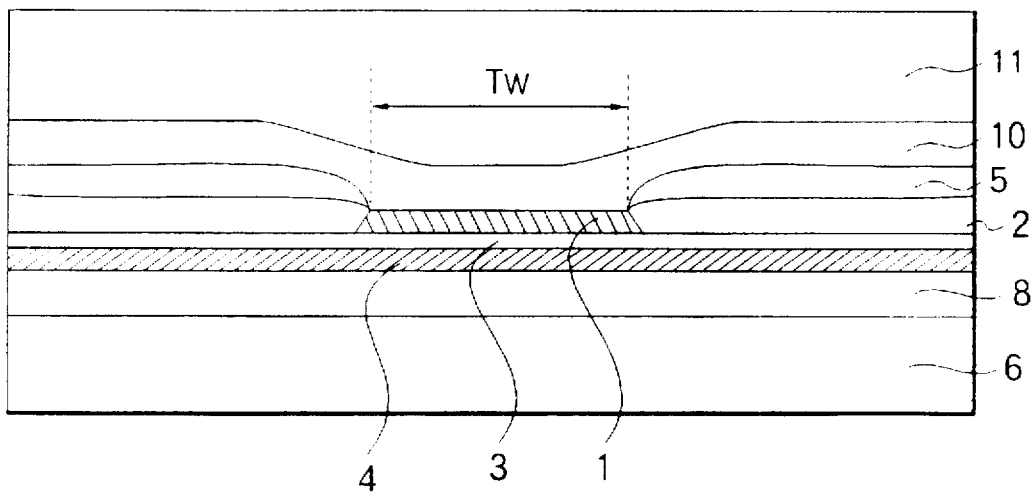
FIG. 4 is an end view of an MR head of the forth example of the invention.

FIG. 4 shows an enlarged structure of an MR element of an MR head observed from an air bearing surface, in which an MR layer 1 is positioned on a non-magnetic spacer layer 3 extending over an SAL 4 and hard magnet layers 2 for longitudinally biasing are placed with an abutting junction with the MR layer. The soft magnetic layer (SAL) 4 of NiFeCr was formed over an under-reproducing gap layer 8 extending over a CoTaZr under-shield layer 6 and the non-magnetic spacer layer 3 of Ta and the MR layer 1 were formed in piles. The SAL /Ta/MR multilayer was treated by a milling process to form a stripe. Then, after the off-track region of the MR layer 1 was removed, the hard magnet layers 2 and Mo conductor leads 5 were formed. The track width Tw of the MR layer 1 was 2 um. Further, an insulating layer 10 and an upper-shield layer 11 were formed on the element. The layer thickness of the MR layer 1 and the SAL was 20 nm and 15 nm, respectively.

As a result of recording/reproducing evaluation of the prepared MR head, the normalized reproducing outputs (converted value per track width) were 200 to 256 mV/um. In the evaluation, the recording track width was 2.7 um. The MR head was designed so that the sensing current density in the MR layer 1 was $2.5 \times 10^7$ A/cm$^2$ and the reproducing output was evaluated with sensing current which wave asymmetry was less than 5%. As in EXAMPLE 1, the MR head of this example provided higher output than the conventional head. The reduction of the effective track width in the MR head of this example was observed to be 0.3 to 0.7 um. Accordingly, the MR head of the present invention was excellent in track width control as compared with the conventional one. Since the MR layer 1 formed an abutting junction with the hard magnet layer 2, a longitudinal field was applied to the MR layer 1 mainly due to the magnetic field exerting from the hard magnet layers 2. And, it is supposed that a weak longitudinal bias was applied to the SAL 4 since a non-magnetic spacer layer 3 lay between the SAL 4 and the hard magnet layers and leakage magnetic field from the hard magnet layers returned through the SAL. The magnetization in the SAL 4 had an opposite direction to that in the MR layer 1 due to the leakage flux returning.

(EXAMPLE 5)

Figure 5:
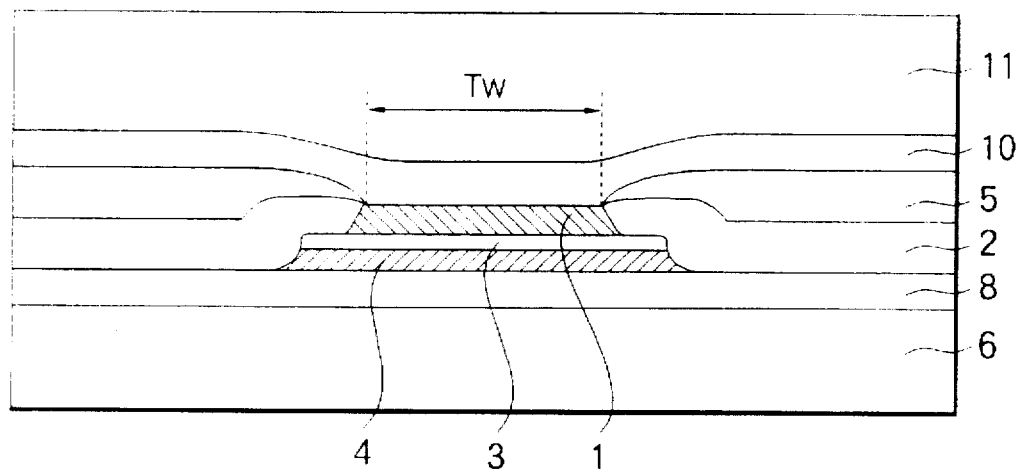
FIG. 5 is an end view of an MR head of the fifth example of the invention.

FIG. 5 shows an enlarged structure of an MR element portion of another example observed from an air bearing surface, in which an MR layer 1 is positioned on a non-magnetic spacer layer 3 extending over an SAL 4 and hard magnet layers 2 for longitudinally biasing are placed at the off-track region. As explained in EXAMPLE 3, the soft magnetic layer (SAL) 4 of NiFeCr, the non-magnetic spacer layer 3 of Ta and the MR layer 1 were formed on an under-reproducing gap layer 8 extending over an under-shield layer 6 of CoTaZr. The SAL/Ta /MR multilayer was treated by a milling process to form a stripe being 3.5 um long. After track width of the MR layer 1 was processed, the hard magnet layers 2 and Mo conductor leads 5 were formed. The track width of the MR layer 1 was 2 um. Further, an upper-shield layer 11 was formed over an upper-reproducing gap layer 10 on the MR element. The thickness of the MR layer 1 and the SAL 4 was 20 nm and 15 nm, respectively.

As a result of recording/reproducing evaluation of the prepared MR head, the normalized reproducing outputs (converted value per track width) were 195 to 245 mV/um. In the evaluation, the recording track width was 2.7 um. The MR head was designed so that the sensing current density in the MR layer 1 was $2.5 \times 10^7$ A/cm$^2$ and the reproduction output was evaluated with sensing current which wave asymmetry was less than 5%. As in EXAMPLE 1, the MR head of this example provided higher output than the conventional head The reduction of the effective track width in the MR head of this example was observed to be 0.3 to 0.7 um. Accordingly, the MR head of the present invention was excellent in track width control as compared with the conventional one. And, the longitudinal bias, measured by an MFM apparatus, in each track region of the MR layer and the SAL was 16 Oersteds and 8 Oersteds, respectively.

Although both the MR layer and the SAL formed an abutting junction with the hard magnet layers in this example, the magnetic field from the hard magnet layers less influenced the SAL than the MR layer, since the SAL extended as far as the off-track region. The longitudinal bias was more weakly applied to the SAL 4 by the magnetic field from the hard magnet layers than the MR layer 1. A conventional MR head was tapered at track end portion and the taper width (abutting junction width) was 0.3 um at most. In this example, while the track width of the MR layer was 2 um, the SAL width was 3.5 um. The abutting junction width of this example was 0.75 um at one side.

As explained above, the invention provides a magnetoresistive (MR) head comprising a magnetoresistive conductive layer (MR layer), a soft magnetic layer (SAL) for transversely biasing, means for longitudinally biasing and controlling magnetization in the central sensing regions of the MR layer and the SAL, means for transversely biasing to make the central sensing region of the MR layer be in a linear response mode and conductor leads for sensing signals at the MR layer, wherein the MR head has a structure that the track region effectively detects signals from medium, that is, the longitudinal bias applied to the SAL is weaker than that to the MR layer to improve reproducing output.

According to the invention, since the reduction of an effective track width from a physical track width is less than that of a conventional MR head of abutting junction type, a wider effective track can be obtained.

What is claimed is:

1. A magnetoresistive head for reading data recorded on a track in a magnetic recording medium, the track having a width extending in a track width direction, comprising:

a multilayered structure having a magnetoresistive conductive layer, a non-magnetic spacer layer and a transverse bias layer formed of a soft magnetic material, the multilayered structure extending in a longitudinal direction corresponding to the track width direction and having a track region with a length corresponding to the width of the track, the magnetoresistive conductive layer being shorter in the longitudinal direction than the transverse bias layer;

conductor leads for supplying electric current to the magnetoresistive conductive layer to detect a magnetic signal in the magnetoresistive conductive layer; and a hard magnet layer formed to abut ends of the magnetoresistive conductive layer and the transverse bias layer, for applying a longitudinal magnetic bias across the magnetoresistive conductive layer and the transverse bias layer in the longitudinal direction, such that in the track region, the longitudinal magnetic bias in the transverse bias layer is weaker than that in the magnetoresistive conductive layer.

2. A magnetoresistive head as set forth in claim 1, wherein in the track region, the longitudinal magnetic bias in the transverse bias layer is weak enough to allow the transverse bias layer to be saturated in a transverse direction perpendicular to the longitudinal direction.

3. A magnetoresistive head for reading data recorded on a track in a magnetic recording medium, the track having a width extending in a track width direction, comprising:

a multilayered structure having a magnetoresistive conductive layer, a non-magnetic spacer layer and a transverse bias layer formed of a soft magnetic material, the multilayered structure extending in a longitudinal direction corresponding to the track width and having a track region and adjacent off-track regions, the track region having a length corresponding to the width of the track, the magnetoresistive conductive layer being formed in the track region and the off-track regions, the transverse bias layer being formed only in the track region and being formed over the magnetoresistive conductive layer with the non-magnetic spacer layer separating the transverse bias layer and the magnetoresistive conductive layer;

conductor leads for supplying electric current to the magnetoresistive conductive layer to detect a magnetic signal in the magnetoresistive conductive layer; and a hard magnet layer formed under the magnetoresistive conductive layer to contact the magnetoresistive conductive layer, the hard magnetic layer being formed only in the off-track regions for applying a longitudinal magnetic bias across the magnetoresistive conductive layer and the transverse bias layer in the longitudinal direction, such that in the track region, the longitudinal magnetic bias in the transverse bias layer is weaker than that in the magnetoresistive conductive layer and the longitudinal bias in the transverse bias layer is small enough to allow the transverse bias layer to be saturated in a transverse direction, perpendicular to the longitudinal direction and the magnetic recording medium.

4. A magnetoresistive head for reading data recorded on a track in a magnetic recording medium, the track having a width extending in a track width direction, comprising:

a multilayered structure having a magnetoresistive conductive layer, a non-magnetic spacer layer and a transverse bias layer formed of a soft magnetic material, the multilayered structure extending in a longitudinal direction corresponding to the track width and having a track region and adjacent off-track regions, the track region having a length corresponding to the width of the track, the magnetoresistive conductive layer being formed in the track region and the transverse bias layer being formed in the track region and the off-track regions, the transverse bias layer being longer in the longitudinal direction than the magnetoresistive conductive layer;

conductor leads for supplying electric current to the magnetoresistive conductive layer to detect a magnetic signal in the magnetoresistive conductive layer; and a hard magnet layer formed over the transverse bias layer in the off-track regions to abut ends of the magnetoresistive conductive layer, for applying a longitudinal magnetic bias across the magnetoresistive conductive layer and the transverse bias layer in the longitudinal direction, such that in the track region, the longitudinal magnetic bias in the transverse bias layer is weaker than that in the magnetoresistive conductive layer and the longitudinal bias in the transverse bias layer is small enough to allow the transverse bias layer to be saturated in a transverse direction, perpendicular to the longitudinal direction and the magnetic recording medium.

5. A magnetoresistive head as set forth in claim 4, wherein the hard magnet layer is formed directly over the transverse bias layer in the off-track regions.

6. A magnetoresistive head as set forth in claim 4, wherein the non-magnetic spacer layer is positioned between the transverse bias layer and the hard magnet layer.

7. A magnetoresistive head with hard magnetic bias as set forth in claim 6, wherein bias direction of the transverse bias layer is opposite to that of the magnetoresistive conductive layer or the hard magnet layer.

8. A magnetoresistive head for reading data recorded on a track in a magnetic recording medium, the track having a width extending in a track width direction, comprising:

a multilayered structure having a magnetoresistive conductive layer, a non-magnetic spacer layer and a transverse bias layer formed of a soft magnetic material, the multilayered structure extending in a longitudinal direction corresponding to the track width direction and having a track region with a length corresponding to the width of the track;

conductor leads for supplying electric current to the magnetoresistive conductive layer to detect a magnetic signal in the magnetoresistive conductive layer, the electric current in the magnetoresistive conductive layer causing a transverse magnetic bias to be generated in the transverse bias layer in a transverse direction perpendicular to the longitudinal direction and the magnetic recording medium; and a hard magnetic layer for applying a longitudinal magnetic bias across the magnetoresistive conductive layer and the transverse bias layer in the longitudinal direction, such that in the track region, the longitudinal magnetic bias in the transverse bias layer is weaker than that in the magnetoresistive conductive layer and less than 70% of the transverse magnetic bias in the transverse bias layer.

9. A magnetoresistive head as set forth in claim 8, wherein the magnetoresistive conductive layer is shorter in the longitudinal direction than the transverse bias layer, and the hard magnet layer abuts ends of the magnetoresistive conductive layer and the transverse bias layer.

10. A magnetoresistive head as set forth in claim 8, wherein in the track region, the longitudinal magnetic bias in the transverse bias layer is small enough to allow the transverse bias layer to be saturated in the transverse direction.

11. A magnetoresistive head as set forth in claim 10, wherein the magnetoresistive conductive layer is shorter in the longitudinal direction than the transverse bias layer, and the hard magnet layer abuts ends of the magnetoresistive conductive layer and the transverse bias layer.

12. A magnetoresistive head according to claim 10, wherein the multilayered structure has off-track regions adjacent to the track region, the magnetoresistive conductive layer is formed in the track region and the off-track regions, the hard magnet layer is formed under the magnetoresistive conductive layer to contact the magnetoresistive conductive layer, the hard magnet layer is formed only in the off-track regions, the transverse bias layer is formed only over the track region of the magnetoresistive conductive layer, and the non-magnetic spacer layer separates the magnetoresistive conductive layer and the transverse bias layer.

13. A magnetoresistive head according to claim 10, wherein the multilayered structure has off-track regions adjacent to the track region, the magnetoresistive conductive layer is formed only in the track region, the hard magnet layer is formed in the off-track regions, level with the magnetoresistive conductive layer, the non-magnetic spacer layer separates the magnetoresistive conductive layer and the transverse bias layer, and the transverse bias layer is not level with the hard magnet layer.

14. A magnetoresistive head as set forth in claim 10, wherein the transverse bias layer is longer in the longitudinal direction than the magnetoresistive conductive layer.

15. A magnetoresistive head as set forth in claim 14, wherein the multilayered structure has off-track regions adjacent to the track region, the transverse bias layer is formed in the track region and the off-track regions, the hard magnet layer is formed directly over the off-track regions of the transverse bias layer, the magnetoresistive conductive layer is formed in the track region, and the hard magnet layer abuts ends of the magnetoresistive conductive layer.

16. A magnetoresistive head as set forth in claim 14, wherein the multilayered structure has off-track regions adjacent to the track region, the transverse bias layer is formed in the track region and the off-track regions, the hard magnet layer is formed in the off-track regions, over the transverse bias layer, the non-magnetic spacer separates the transverse bias layer and the hard magnet layer, the magnetoresistive conductive layer is formed in the track region, and the hard magnet layer abuts ends of the magnetoresistive conductive layer.

17. A magnetoresistive head with hard magnetic bias as set forth in claim 16, wherein bias direction of the transverse bias layer is opposite to that of the magnetoresistive conductive layer or the hard magnet layer.

18. A magnetoresistive head as set forth in claim 14, wherein the hard magnet layer abuts ends of both the magnetoresistive conductive layer and the transverse bias layer.

* * * * *

UNITED STATES PATENT AND TRADEMARK OFFICE
CERTIFICATE OF CORRECTION

PATENT NO. : 5,754,376
DATED : May 19, 1998
INVENTOR(S) : Toshio Kobayashi, et al.

It is certified that error appears in the above-identified patent and that said Letters Patent is hereby corrected as shown below:

Column 1,      line 47, delete "of".

Column 6,      line 44, change, "256" to --250--.
               line 54, after "one." begin new paragraph.

Column 7,      line 26, after "head" insert --.--

Signed and Sealed this

Eighth Day of September, 1998

Attest:

BRUCE LEHMAN

Attesting Officer    Commissioner of Patents and Trademarks